United States Patent [19]

Maute et al.

[11] Patent Number: 5,105,356

[45] Date of Patent: Apr. 14, 1992

[54] METHOD FOR CURVE CORRELATION

[75] Inventors: Robert E. Maute, Richardson; F. Fay Osborn, Dallas, both of Tex.

[73] Assignee: Mobil Oil Corporation, Fairfax, Va.

[21] Appl. No.: 379,758

[22] Filed: Jul. 14, 1989

[51] Int. Cl.⁵ .......................... G01V 1/00; G01V 3/08
[52] U.S. Cl. ...................................... 364/422; 324/338
[58] Field of Search ..................... 364/422; 367/22; 324/338

[56] References Cited

U.S. PATENT DOCUMENTS

| | | | |
|---|---|---|---|
| 4,223,399 | 9/1980 | Hackett | 367/41 |
| 4,383,220 | 5/1983 | Balwin | 324/338 |
| 4,453,219 | 6/1984 | Clavier et al. | 364/422 |
| 4,517,835 | 5/1985 | Kerzner | 73/152 |
| 4,541,275 | 9/1985 | Kerzner | 364/422 |
| 4,578,645 | 3/1986 | Hoehn, Jr. | 324/338 |
| 4,581,584 | 4/1986 | Balwin | 324/338 |
| 4,600,887 | 7/1986 | Balwin et al. | 324/333 |
| 4,683,552 | 7/1987 | Willis | 367/57 |
| 4,683,556 | 7/1987 | Willis | 367/27 |
| 4,939,649 | 7/1990 | Duffy | 364/422 |

Primary Examiner—Dale M. Shaw
Assistant Examiner—Xuong M. Chung
Attorney, Agent, or Firm—Alexander J. McKillop; Charles J. Speciale; George W. Hager, Jr.

[57] ABSTRACT

The maximum correlation between a pair of curves is determined from the maximum value of the common area of such curves with respect to reference lines within a select window as one of the curves is moved through the window while the other of the curves remains fixed within the window.

15 Claims, 4 Drawing Sheets

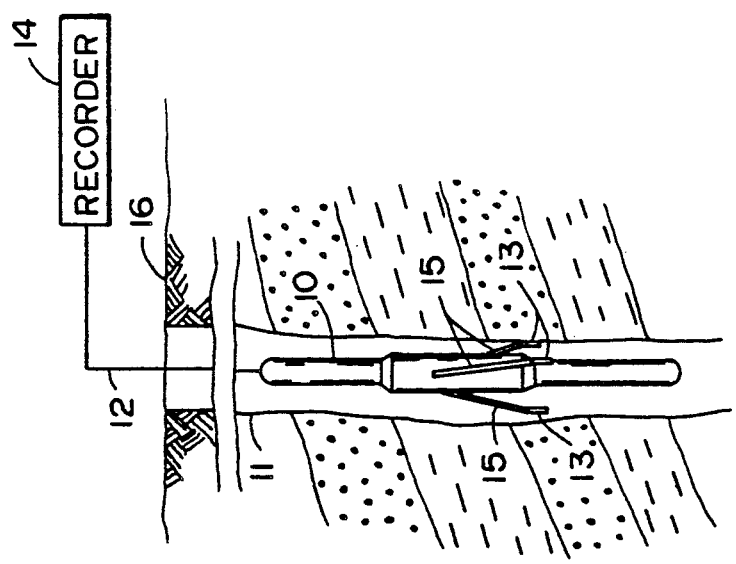
FIG. 1
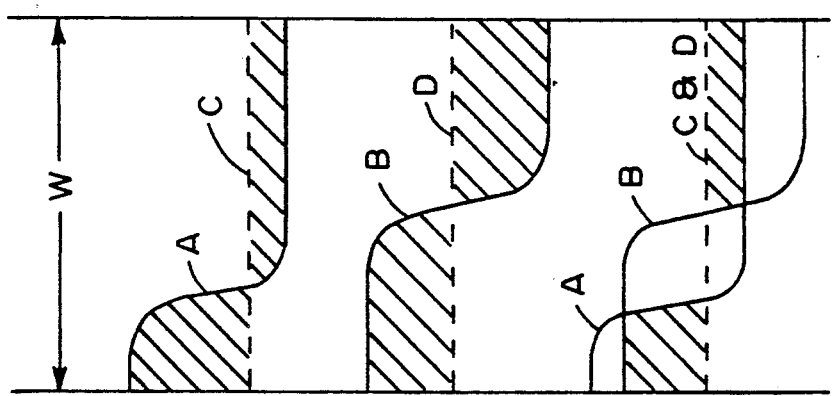
FIG. 2A
FIG. 2B
FIG. 2C

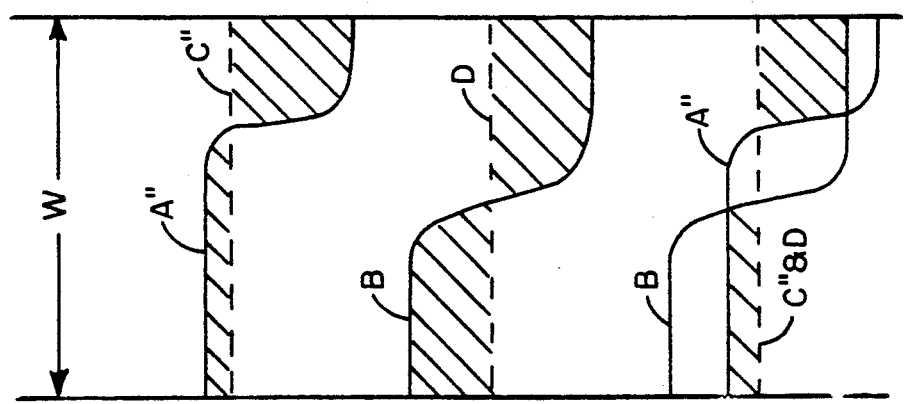
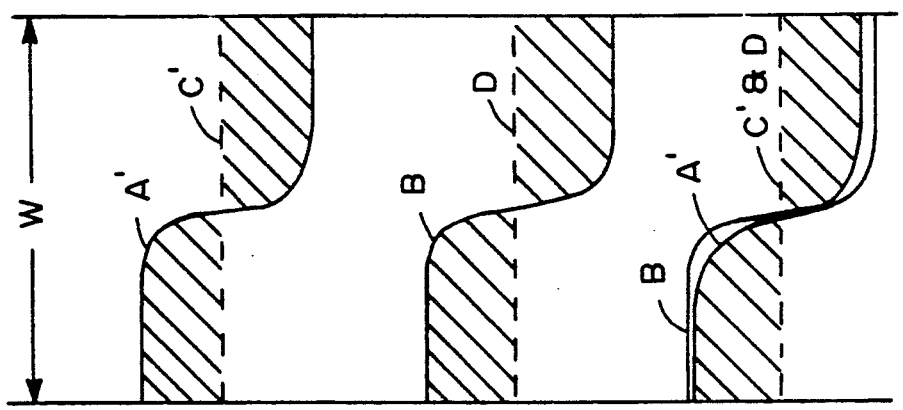

METHOD FOR CURVE CORRELATION

BACKGROUND OF THE INVENTION

Correlation methods for determining the strength of the linear relationship between two or more variables are among the most widely applied statistical techniques. One of the most common areas of application is in geophysical exploration where it is desirable to perform a correlation operation on geophysical logs. The desirability of performing such a correlation operation is the determination of the degree of match, or similarity, of portions of the logs. The correlation function produced by correlating the two logs has a magnitude indicative of the degree of match, or similarity, of sections of the logs. Correlation is a well known statistical operation as generally described in *Seismic Exploration Fundamentals*, by J. A. Coffen, the Petroleum Publishing Co., Tulsa, Okla., 1978, pages 115-118 and in *Encyclopedia of Statistical Sciences*, Vol. 2, John Wiley & Sons, N.Y., 1982, pages 193-204. One good example is the determination of the dip of subsurface beds from well logs. In this case, correlation of the logs produced in a pair of spaced-apart boreholes produces a function having a maximum which occurs at a depth difference which is indicative of the dip of the subsurface layers between the two boreholes. Such an example is shown in U.S. Pat. No. 3,304,535 to P. L. Lawrence.

Another example of the use of correlation techniques in geophysical prospecting is the correlation of the various components of a dipmeter log from a single borehole to determine the depth displacements between such components. These depth displacements will depend on the dip magnitude and direction of the formation bedding surfaces.

Correlation has been successfully applied in the geophysical art to both seismograms and various types of well logs.

Examples of such correlation operations on dipmeter logs are described in "Automatic Computation of Dipmeter Logs Digitally Recorded on Magnetic Tapes" by Moran, Coufleau, Miller and Timmons, *Petroleum Transactions*, July, 1962, Pages 771-782; *Dipmeter Interpretation*, Schlumberger Limited, N.Y. 1986, pages 1-12; and *Cluster—A Method For Selecting The Most Probable Dip Results From Dipmeter Survey*, by Hepp and Dumestre, Society of Petroleum Engineers of AIME, Dallas, Tex. 1975, SPE 5543, Pages 1-16.

SUMMARY OF THE INVENTION

In accordance with the present invention, there is provided a correlation method for determining the strength of the linear relationship between a pair of curves representing data of varying amplitudes. In carrying out the method, a window is selected along each of the pair of curves. A first reference line is determined at an amplitude position of a first of the curves within a selected first window along such first curve. A second reference line is determined at an amplitude position of a second of the curves within a selected second window along such second curve. One of the curves is then offset in amplitude with respect to the other of the curves such that the first and second reference lines coincide. The common area to the two curves is then determined. Thereafter one of the curves is moved through its selected window in a plurality of incremental shifts while the other curve remains fixed. After each increment shift, the common area to the two curves within the selected windows is again determined. The plurality of common areas are then compared to one another to identify the maximum value for the common area within the selected windows. The incremental shift of the moving curve associated with such maximum common area value identifies the maximum correlation of the two curves within the selected windows.

In a further aspect, the value of each common area is determined by identifying an area bounded by the first curve, the first reference line and the first window which coincides with an area bounded by the second curve, the second reference line and the second window. Preferably the reference lines may represent the arithmetic averages of the two curves.

After the point of maximum correlation is determined for the two curves within the selected windows, at least one of the windows is shifted and the common area correlation of the two curves again carried out.

This method of common area correlation is particularly useful in the processing of borehole dipmeter log data acquired from differing sides of a borehole to determine the dip of subsurface formations along the borehole associated with the selected windows, such windows representing select borehole depth intervals.

BRIEF DESCRIPTION OF THE DRAWINGS

FIG. 1 illustrates a borehole logging system for recording borehole logs which may be correlated in accordance with the method of the present invention to identify dip of subsurface formations surrounding a borehole.

FIGS. 2A-2C, 3A-3C and 4A-4C are graphical representations of a pair of curves, such as may be recorded on borehole logs obtained by the logging system of FIG. 1, which are shifted with respect to one another to provide for differing correlation values in accordance with the common area correlation method of the present invention.

DESCRIPTION OF PREFERRED EMBODIMENT

Figure 5:
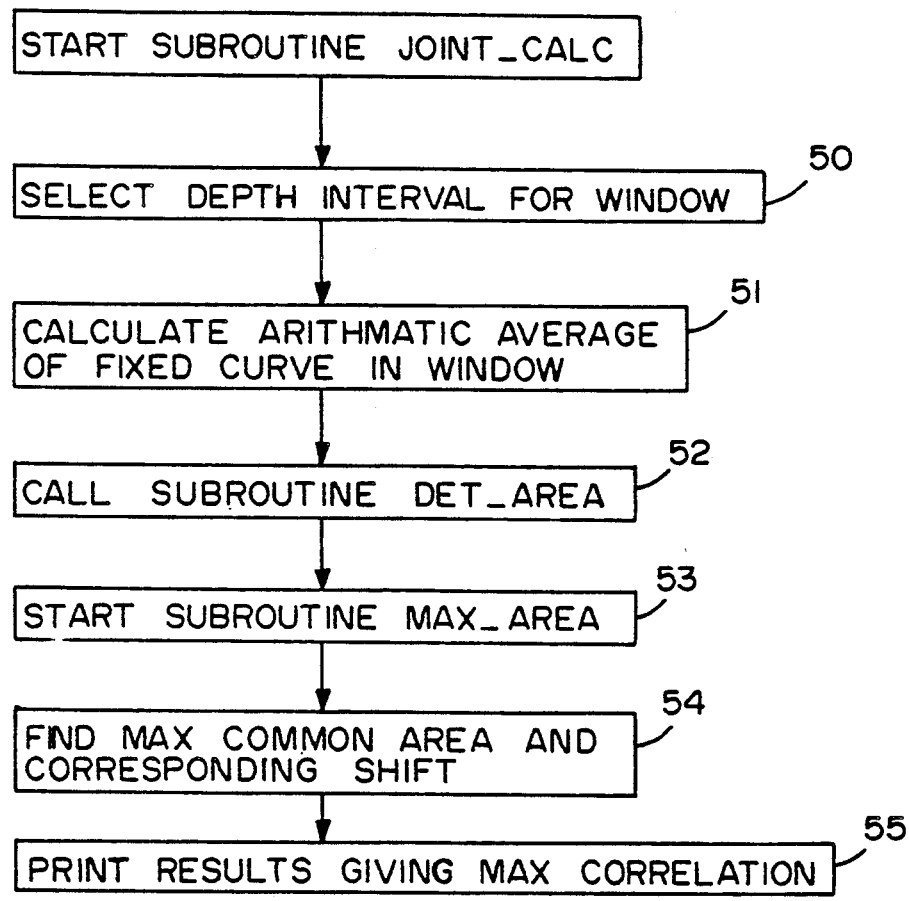
FIGS. 5-6 are flow charts of an algorithm used to carry out the common area correlation method of the present invention represented graphically in FIGS. 2A-2C, 3A-3C and 4A-4C.

In the past, correlation operations, particularly in the geophysical art, have been given specific terms based on the type of correlation carried out, e.g. cross-correlation, auto-correlation, semblance-correlation, etc. These various techniques are set forth in the aforementioned articles. Further reference may be made to U.S. Pat. No. 4,223,399 to Hackett and U.S. Pat. No. 4,683,556 to M. E. Willis.

The present invention is, however, directed to a new correlation technique that differs from the previously known and described techniques in that it makes use of the common area under two curves to determine correlation. Such new correlation technique, while applicable to the correlation of two curves of any random variables, will hereinafter be described in its application to geophysical dipmeter logs as may be acquired by conventional borehole dipmeter systems, such as described generally in U.S. Pat. Nos. 3,388,323 to A. A. Stripling; 4,578,645 to W. F. Baldwin; 4,600,887 to W. F. Baldwin and L. C. Shen; and 4,383,220 and 4,581,584 to W. F. Baldwin.

Initially a dipmeter log is obtained by a dipmeter logging tool such as shown generally in FIG. 1. The dipmeter 10 is supported in a borehole 11 by a multiconductor logging cable 12 which extends from the dipmeter 10 to the surface 16 of the earth. Cable 12 connects with a recorder 14 for recording signals received by the dipmeter 10. The recorded log may be acoustic, electromagnetic, or micro-resistive depending on the type of measurements made by the dipmeter. For example, dipmeter 10 may be of the type that measures formation electrical properties such as the micro-resistivity type dipmeter described in the forementioned U.S. Pat. No. 3,388,323. The dipmeter will include at least three pads 13 comprised of sensors spaced approximately equally around the longitudinal axis of the dipmeter and positioned against the wall of the borehole 11 by support means 15 for measuring formation resistivity along three spaced aparts positions around the borehole wall. Reference may be made to the aforementioned U.S. Pat. No. 4,581,584 for a more detailed description of an electromagnetic type dipmeter.

Having described a typical logging tool with which the common area correlation method of the present invention may be utilized, such method will now be described in conjuction with FIGS. 2–7.

In carrying out the method of the present invention, a window is selected for each of a pair of curves along a recorded dipmeter log representing measurements recorded on the dipmeter log from differing sides of the borehole at borehole intervals wherein the dip of the subsurface formation bedding is to be determined. These windows may be selected to represent borehole intervals for the pair of curves having the same or differing interval lengths and centered about the same or differing borehole depths. For purpose of describing the method of the present invention reference may be made to FIGS. 2, 3A–3C and 4A–4C wherein these windows are shown as being of the same interval length along a pair of dipmeter log curves A and B. Therefore, for purposes of simplicity of description hereinafter, such windows will be described as a common window W. This step of window selection is shown at 50 in the flow charts of FIG. 5.

One of the curves, A or B, is selected as a moving curve, that is, the curve is shifted within the window W through a plurality of shifts and is correlated at each shift with the other curve, hereinafter termed the fixed curve in accordance with the common area correlation method of the present invention. For purposes of example, curve A will be designated as the moving curve and curve B will be designated as the fixed curve.

Reference lines are determined for both curves A and B representing preferably the arithmetic average or means for each curve, that is, each reference line represents the position on the amplitude scale wherein the area of the curve above the reference line is equal to the area of the curve below the reference line. An arithmetic average is typically determined by adding digital samples taken at spaced intervals along the curve and dividing by the number of samples. Such reference lines for curves A and B are shown as dashed lines C and D respectively in FIGS. 2A and 2B. For example, in FIG. 2A reference line C represents the position along curve A within the window W wherein the area of curve A above the line E is equal to the area of curve A below the reference line C. Likewise as shown in FIG. 2B reference line D represents the position along curve B within the window W wherein the area of the curve B above line D is equal to the area of curve B below line D. The calculation of these two averages, i.e. reference lines C and D is shown at step 61 in FIG. 6 and at step 51 in FIG. 5 respectively.

To compare curves A and B, the moving curve A is first offset within the window as shown at step 62 so that the two reference lines C and D coincide. This is illustrated in FIG. 2C. At step 63 the common area of the curves A and B on the same side of the reference lines C and D is determined. This common area is the cross-hatched areas shown in FIG. 2C.

The foregoing steps 61–63 are then repeated for a plurality of incremental shifts of the moving curve A throughout the window W. At each such incremental shift a new reference is determined for the moving curve B, it is then offset to coincide with the reference for fixed curve B, and a new common area determined for the two curves. After moving curve A has been shifted through the window W, such incrementing step 64 is stopped and the determined common areas associated with the plurality of incremental shifts are compared at step 54 of FIG. 5 to identify the maximum value for such common area. This maximized common area occurs at the shift for moving curve A at which there is the greatest degree of correlation between the two curves.

To illustrate such incrementing through steps 61 and 63 more fully, reference is made to FIGS. 3A–3C and 4A–4C. After an initial common area is determined as shown in FIG. 2C, the moving curve A is shifted one incremental position to that shown as A' in FIG. 3A and a new reference C' determined. Curve B remains fixed in FIG. 3B to the same position and with the same reference shown in FIG. 2B. Curve A' is then offset to cause its reference C' to coincide with the reference D of curve B as shown in FIG. 3C and the new common area is determined as the hatched area in FIG. 3C.

Similarly, steps 61–63 are again repeated with curve A' being shifted to the position A" shown in FIG. 4A and then offset so that its new average C" coincides with the average D of curve B. A new common area is determined as shown in the hatched area of FIG. 4C.

For the illustrations of FIGS. 2A–2C, 3A–3C and 4A–4C, it can be seen that the common area for the curves A and B is maximized in FIG. 3C for the shift shown in FIG. 3A. It is therefore this shift which identifies the maximum correlation between curves A and B over the interval of the selected window W.

Having now determined the best correlation of the two curves in the selected window W, a new window is selected and the foregoing steps repeated. As noted hereinabove, each window will represent a different borehole depth interval. For a 4 foot window W, typical incremental shifts of such window may be in the order of two feet each. By finding the maximum correlation at each of a plurality of incremental depth intervals, the dip of the subsurface formation bedding faces over such depth intervals can be identified. For example, for a borehole logging tool carrying out conventional electromagnetic, acoustic or microresistivity measurements along different sides of the borehole, the shifts associated with maximum correlation of the recorded electromagnetic, acoustic, or microresistivity curves for each window shift are used to determine formation dip.

Figure 6:
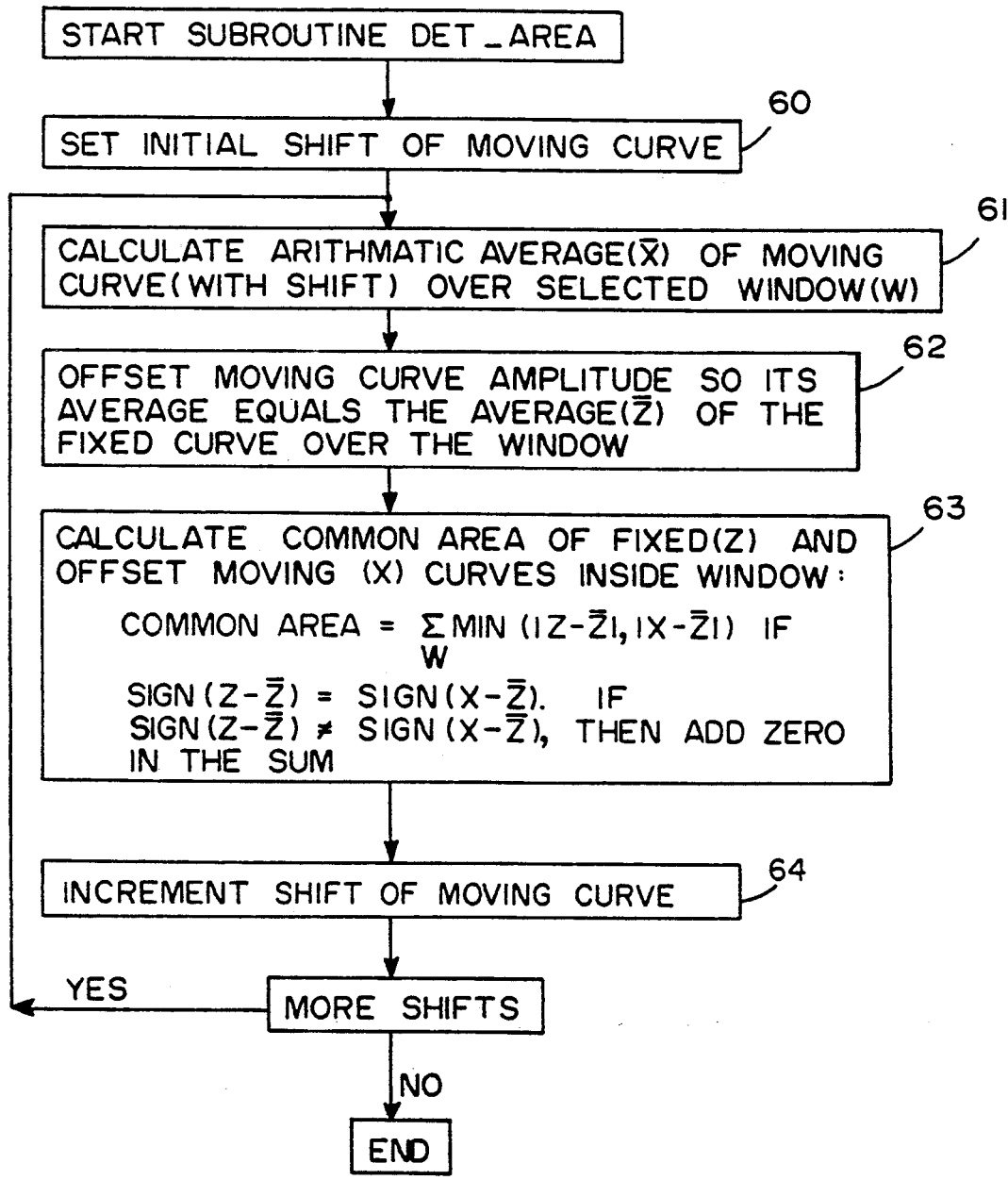

Having referred to the flow charts of FIGS. 5–6 generally in describing the method of the present invention, a more detailed description of such flow charts will now be made. FIGS. 5–6 illustrate three algorithm subroutines used in correlating curves by the common area method of the invention. Referring firstly to FIG. 5, the first subroutine is called JOINT_CALC and is the basic subroutine which initiates the common area correlation process by selecting at step 50 a window for a given depth interval and calcuating at step 51 the reference of the fixed curve within the window. At step 52, subroutine JOINT_CALC calls up the DET_AREA subroutine of FIG. 6. Subroutine DET_AREA carries out the shifts and offsets for the moving curve and calculates common area (steps 60–64) as described hereinabove. After common area is determined for each incremental shift of the moving curve, the JOINT_CALC subroutine starts the MAX_AREA subroutine at step 53 of FIG. 5. Subroutine MAX_AREA determines, at step 54, the maximum calculated common area and associates the moving curve shift for such maximized common area as the best correlation of the two curves within the selected window. Following completion of the correlation process for the window selected the JOINT_CALC subroutine calls for printing, at step 55, the correlation results.

While a preferred embodiment of the method of the present invention has been described and illustrated, numerous modifications or alterations may be made without departing from the spirit and scope of the invention as set forth in the appended claims.

I claim:

1. A method for generating a geophysical dipmeter log of a subsurface formation surrounding a borehole, comprising the steps of:
   a) lowering a dipmeter logging tool having at least three geophysical sensors at angular positions displaced from the longitudinal axis of said tool and equally spaced apart around said axis to an initial borehole depth within said borehole,
   b) positioning each of said sensors against the wall of said borehole, each of said sensors producing a signal which changes in accordance with a geophysical property change of said formations,
   c) traversing said logging tool through an initial borehole depth interval,
   d) recording changes in said geophysical property in correlation with depth,
   e) selecting a first window along a first geophysical recording for said initial borehole interval,
   f) selecting a second window along a second geophysical recording for said initial borehole interval,
   g) determining a first reference line along said first geophysical recording within said first window representing a first amplitude position along said first geophysical recording,
   h) determining a second reference line along said second geophysical recording within said second window representing a second amplitude position along said second geophysical recording,
   i) offsetting one of said geophysical recordings in amplitude with respect to the other of said geophysical recordings such that said first and second reference lines coincide,
   j) determining common areas of said geophysical recordings with coinciding reference lines,
   k) incrementally shifting said first geophysical recordings through said first window and repeating steps (e)–(j) following each incremental shift,
   l) comparing the common areas of said geophysical recordings determined in steps (i) and (j) following each of said incremental shifts to identify a maximum value for said common areas,
   m) determining the maximum correlation of said first and second geophysical recordings from positions of said geophysical recordings within said first and second windows yielding the maximum value of said common areas.
   n) traversing said logging tool through a plurality of borehole depth intervals along said borehole,
   o) repeating steps (d)–(m) for each of said plurality of depth intervals as said logging tool traverses said borehole, and
   p) generating a dipmeter log representative of the dip of said subsurface formation with depth from said determined maximum correlations of said geophysical recordings.

2. The method of claim 1 wherein:
   a. the area of said first geophysical recording above said first reference line within said first window is equal to the area of said first geophysical recording below said first reference line; and
   b. the area of said second geophysical recording above said second reference line within said second window is equal to the area of said second geophysical recording below said second reference line.

3. The method of claim 1 wherein said first and second reference lines are determined by taking arithmetic averages of said first and second geophysical recordings respectively.

4. The method of claim 1 wherein the common areas of said geophysical recording having coinciding reference lines are determined by identifying an area bounded by said first geophysical recording, said first reference line and said first window which coincides with an area bounded by said second geophysical recording, said second reference line and said second window.

5. The method of claim 1 wherein said step of determining the common area of said geophysical recordings with coinciding reference lines is carried out in accordance with the following expression:

$$\text{COMMON AREA} = \sum_W \text{Min}(|z - \bar{z}|, |x - \bar{z}|) \text{ if,}$$

$$\text{SIGN}(z - \bar{z}) = \text{SIGN}(x - \bar{z})$$

where
   $x$ = amplitude values of said first geophysical recording,
   $z$ = amplitude values of said second geophysical recording,
   $\bar{x}$ = arithmetic average of said first geophysical recording over said first window, and
   $\bar{z}$ = arithmetic average of said second geophysical recording over said second window.

6. The method of claim 5 further comprising the step of adding zero into the summation expression for common area if:

$$\text{SIGN}(z-\bar{z}) \neq \text{SIGN}(x-\bar{z}).$$

7. The method of claim 1 wherein one of said geophysical recordings is fixed during steps d and f while the other of said geophysical recordings is moved both in offset in step d and incrementally in step f.

8. The method of claim 1 further comprising the step of incrementally shifting at least one of said windows and repeating steps b through h for each incremental shift.

9. The method of claim 8 further comprising the step of utilizing the shift of said one of said geophysical recordings identifying said maximum correlation within each shift of said window to determine the dip of the subsurface formations surrounding the borehole.

10. The method of claim 1 wherein said first and second geophysical recordings represent log data acquired from differing sides of a borehole during a microresistivity survey of subsurface formations surrounding said borehole and said windows represent borehole depth intervals.

11. The method of claim 1 wherein said windows are selected to represent identical borehole depth intervals.

12. The method of claim 1 wherein said windows are selected to represent differing borehole depth intervals.

13. The method of claim 12 wherein said windows are selected such that at least a portion of each of said differing borehole depth intervals coincide.

14. The method of claim 1 wherein said selected borehole depth intervals are in the order of four feet.

15. The method of claim 1 wherein each incremental shift of said windows advances borehole depth intervals represented by said windows in the order of two feet.

* * * * *